(12) United States Patent
Derks et al.

(10) Patent No.: US 7,379,600 B2
(45) Date of Patent: May 27, 2008

(54) METHOD AND SYSTEM FOR AUTOMATICALLY DETERMINING DIFFERENCES IN A USER INTERFACE THROUGHOUT A DEVELOPMENT CYCLE

(75) Inventors: Patrick Joseph Derks, Redmond, WA (US); Andrew Seres, Redmond, WA (US); Jidesh Veeramachaneni, Redmond, WA (US); Gregory Allen Keyser, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 10/767,299

(22) Filed: Jan. 28, 2004

(65) Prior Publication Data

US 2005/0188357 A1 Aug. 25, 2005

(51) Int. Cl.
*G06K 9/68* (2006.01)
*G06F 11/00* (2006.01)
(52) U.S. Cl. .......................... 382/218; 714/46
(58) Field of Classification Search ............... 382/209, 382/218, 305; 717/124; 707/102; 715/700, 715/744, 762; 714/46
See application file for complete search history.

(56) References Cited

U.S. PATENT DOCUMENTS 6,075,529 A * 6/2000 Tamegaya .................. 715/744
6,138,270 A * 10/2000 Hsu ........................... 717/125
6,898,764 B2 * 5/2005 Kemp ........................ 715/762
6,907,546 B1 * 6/2005 Haswell et al. ............. 714/38

OTHER PUBLICATIONS

Memon, et al "Coverage criteria for GI testing", ACM, pp. 256-267, 2001.*
J. Takahashi, "An Automated Oracle For Verifying GUI Objects", IEE, Software Engineering Notes, vol. 26, No. 4, pp. 83-88, Jul. 2001.
L. Smith et al., "Android: Open-Source Scripting for Testing and Automation", IEE, Dr. Dobb's Journal, vol. 26, Issue 7, pp. 99-102, Jul. 2001.
J. Takahashi et al., "Effective Automated Testing: A Solution of Graphical Object Verification", IEEE, Proceedings of the 11th Asian Test Symposium, pp. 284-291, Nov. 18-20, 2002.
T. Pugh, "Automated Testing & Windows CE", IEE, Dr. Dobb's Journal, vol. 27, Issue 12, pp. 54-62, Dec. 2002.
J. Takahashi et al., "Effective Automated Testing for Graphical Objects", IEE, Transactions of the Information Processing Society of Japan, vol. 44, No. 7, pp. 1696-1708, Jul. 2003.

* cited by examiner

*Primary Examiner*—Daniel Mariam
(74) *Attorney, Agent, or Firm*—Merchant & Gould P.C.

(57) ABSTRACT

A method and system for automatically determining the differences in a mobile device user interface throughout a development cycle. A test automation is run to exercise a target device's user interface. While the user interface is exercised, an extension is activated that takes snapshots of the user interface output at selected intervals of an automation execution. The snapshots are stored and uploaded to a server where snapshots of different automation executions are then compared on a pixel-by-pixel basis. The differences between snapshots are output in a visual format where the pixels that are different between snapshots are highlighted. The visual format of the differences between snapshots provides the user with a method to readily determine if errors exist in the user interface of the target device.

22 Claims, 8 Drawing Sheets

METHOD AND SYSTEM FOR AUTOMATICALLY DETERMINING DIFFERENCES IN A USER INTERFACE THROUGHOUT A DEVELOPMENT CYCLE

CROSS-REFERENCE TO RELATED APPLICATION

The present invention is related to a patent application entitled "Method and System for Masking Dynamic Regions in a Mobile Device User Interface to Enable Testing of User Interface Consistency," filed concurrently with this application. The related application is assigned to the assignee of the present patent application and hereby incorporated by reference.

BACKGROUND OF THE INVENTION

Complexity of mobile devices such as cellular phones, personal data assistants (PDAs), handheld computers, and others, continues to increase. The market for such devices is steadily becoming a worldwide market, requiring the devices to provide content in a number of different languages and on a number of different platforms. Each different platform may further include a variety of options that result in different user interface outputs depending on the options selected.

The user interface of the device provides the mechanism through which the content of an application on the device is displayed to a user. A user interface provides a set of commands or menus through which a user communicates with a program. A command-driven interface is one in which you enter commands. A menu-driven interface is one in which you select command choices from various menus displayed on the screen.

The user interface is one of the most important parts of any program because it determines how easily you can make the program do what you want. A powerful program with a poorly designed user interface has little value. Graphical user interfaces (GUIs) that use windows, icons, and pop-up menus have become standard on personal computers. Accordingly, for the variety of languages that exist, the user interface is adapted to provide the content and commands in the language required. In addition, a matrix of other differences may exist between user interfaces. For example, a user interface may be displayed in portrait or landscape, in different resolutions, with or without a software input panel (SIP), and with a host of other variables. What is needed is a method for automatically verifying that a user interface is consistent in its display of content despite a change in the language, platform, or other display variables that may be present for a particular user interface output.

SUMMARY OF THE INVENTION

The present invention provides a method and system for automatically determining the differences in a mobile device user interface throughout a development cycle. The present invention involves running a test automation on a target device to exercise that target device's user interface. While the user interface is exercised, an extension is activated that takes snapshots of the user interface output automation execution while it is in selected states. The snapshots are stored and uploaded to a server where snapshots of different automation executions are then compared on a pixel-by-pixel basis. The differences between snapshots are output in a visual format where the pixels that are different between snapshots are highlighted. The visual format of the differences between snapshots provides the user with a method to readily determine if errors exist in the user interface of the target device. Since the differences between snapshots are analyzed on a pixel-by-pixel basis, the present invention operates for devices operating under any language and on any platform.

Along with the automatic comparison of the snapshots, a robust system of data manipulation is provided to assist in the analysis of the user interface throughout a development cycle. In testing the user interface for accuracy, the tester is presented with a number of options for analysis of the data, including but not limited to, a fast test of the accuracy of the snapshots between automation executions that returns a pass/fail variable. Other options are available and other embodiments of the present invention are presented in the figures and detailed description provided below.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
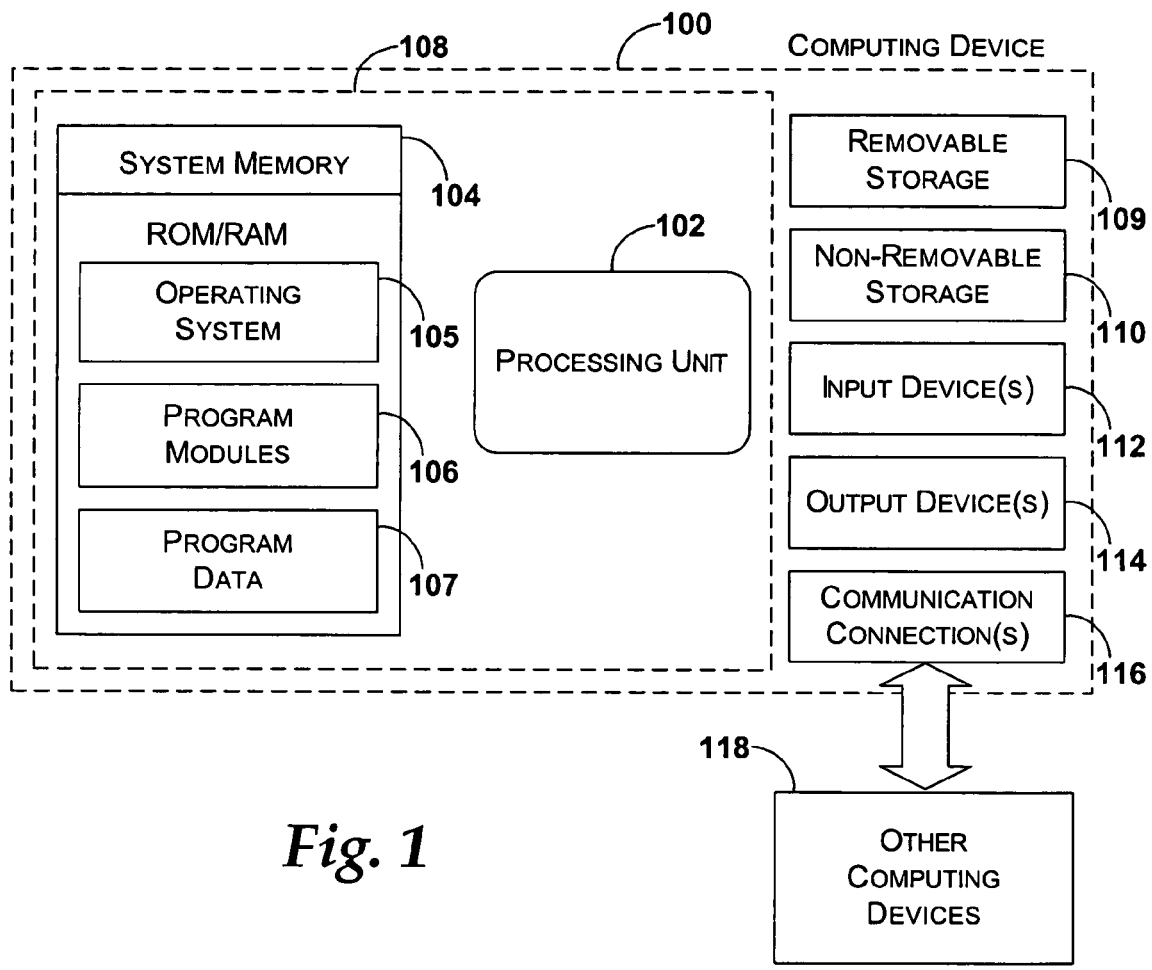
FIG. 1 illustrates an exemplary computing device that may be used in one exemplary embodiment of the present invention.

FIG. 1 shows an exemplary computing device that may be included in system 100 for implementing the invention. Computing device 100 illustrates a general operating environment that may apply to the present invention. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, the system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, stylus, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
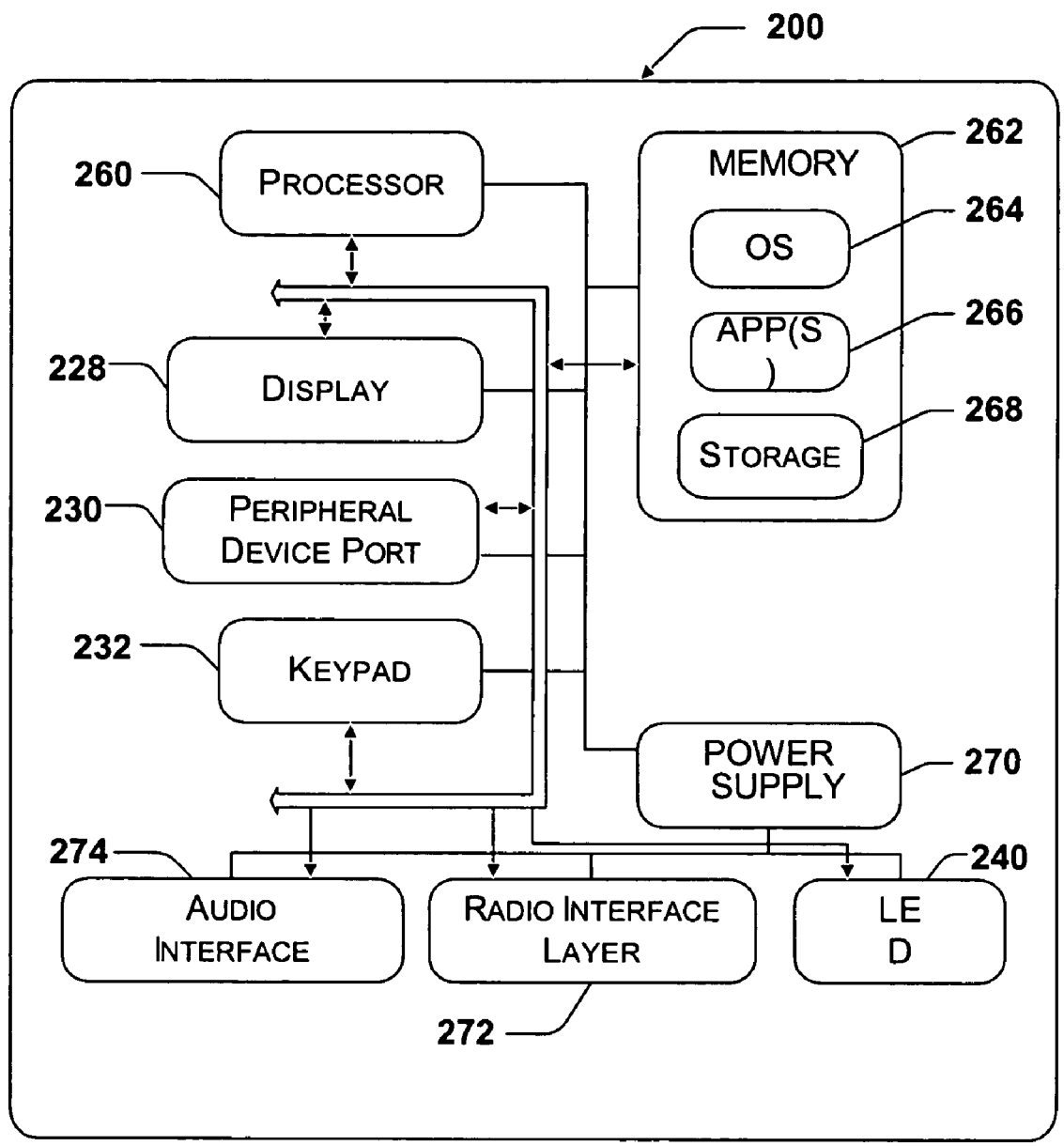
FIG. 2 illustrates an exemplary mobile device that may be used in one exemplary embodiment of the present invention.

FIG. 2 shows an alternative operating environment for a mobile device substantially for use in the present invention. In one embodiment of the present invention, mobile device 200 is integrated with a computing device, such as an integrated personal digital assistant (PDA) and wireless phone.

In this embodiment, mobile device 200 has a processor 260, a memory 262, a display 228, and a keypad 232. Memory 262 generally includes both volatile memory (e.g., RAM) and non-volatile memory (e.g., ROM, Flash Memory, or the like). Mobile device 200 includes an operating system 264, which is resident in memory 262 and executes on processor 260. Keypad 232 may be a push button numeric dialing pad (such as on a typical telephone), a multi-key keyboard (such as a conventional keyboard), or may be not be included in the mobile device in deference to a touch screen or stylus. Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile device 200 also includes non-volatile storage 268 within the memory 262. Non-volatile storage 268 may be used to store persistent information which should not be lost if mobile device 200 is powered down. The applications 266 may use and store information in storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

Mobile device 200 has a power supply 270, which may be implemented as one or more batteries. Power supply 270 might further include an external power source, such as an AC adapter or a powered docking cradle that supplements or recharges the batteries.

Mobile device 200 is also shown with two types of external notification mechanisms: an LED 240 and an audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile device 200 also includes a radio 272 that performs the function of transmitting and receiving radio frequency communications. Radio 272 facilitates wireless connectivity between the mobile device 200 and the outside world, via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 200 to communicate with other computing devices, such as over a network. The radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Automatically Determining Differences in a User Interface

Figure 3:
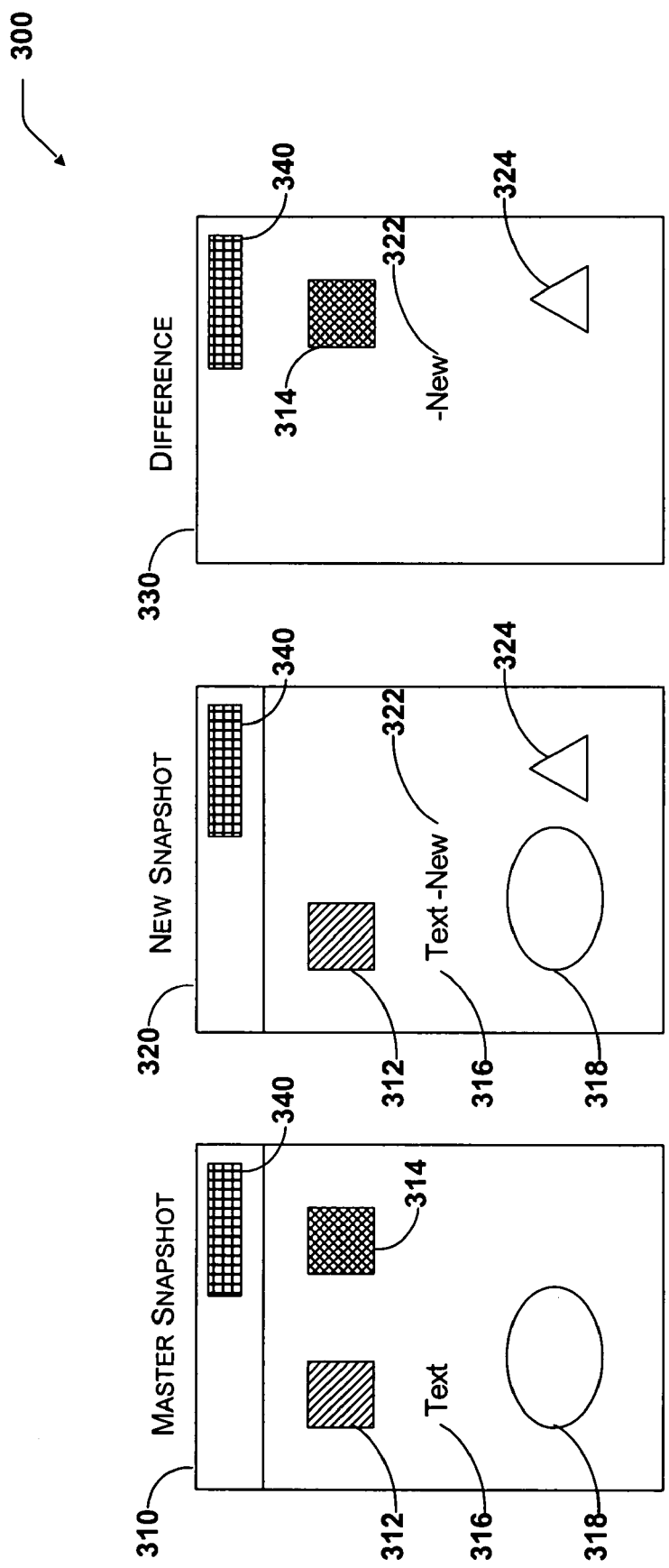
FIG. 3 illustrates exemplary snapshots in accordance with the present invention.

FIG. 3 illustrates exemplary snapshots in accordance with the present invention. The snapshots included are master snapshot 310, also referred to as a baseline snapshot, new snapshot 320, which refers to the snapshot most recently taken, and difference snapshot 330, which provides a visual representation of the difference between the master snapshot and the new snapshot.

Each of the exemplary snapshots shown includes graphical elements and textual elements. In other embodiments, the snapshots may include other elements, such as animations, that may also be captured when the snapshots of the user interface are taken. In the example shown, master snapshot 310 includes graphical elements 312, 314, and 318 and textual element 316. New snapshot 320 includes graphical elements 312, 318, and 324 and textual elements 316 and 322. Upon visual inspection of master snapshot 310 and new snapshot 320, differences are noticeable. The differences between master snapshot 310 and new snapshot 320 are visually represented by difference snapshot 330 on a pixel-by-pixel basis. For each pixel that is different between master snapshot 310 and new snapshot 320, a black pixel is depicted in difference snapshot 330. In one embodiment, a confirmation message such as text reading "no difference" is provided if there is no difference between master snapshot 310 and new snapshot 320.

For example, graphical element 314 is included in master snapshot 310 and not included in new snapshot 320. Due to the difference, the pixels corresponding to graphical element 314 are represented as black pixels in difference snapshot 330. Similarly, textual element 322 and graphical element 324 are included in new snapshot 320 but do not appear in master snapshot 310. As a result, the pixels that correspond to textual element 322 and graphical element 324 are depicted as black pixels in difference snapshot 330 to illustrate that master snapshot 310 and new snapshot 320 differ with respect to these elements. The result in difference snapshot 330 is a readily understandable visual depiction of the differences between master snapshot 310 and new snapshot 320. It is understood that the color of the pixels in difference snapshot 330 is selectable, and black pixels are referred to merely as an example.

Also illustrated in each snapshot shown in FIG. 3, is mask 340. A mask may be selectively included within each snapshot to exclude portions of the user interface from comparison. For example, a clock element included in the user interface changes over time. As a result the clock element would be shown as a difference between master snapshot 310 and each subsequent snapshot taken during a development cycle. Masking the portion of the user interface that corresponds to the clock animation avoids the false positives that result from the difference in each snapshot. A description of masking of dynamic regions of a user interface is included in the related application entitled "Method and System for Masking Dynamic Regions in a Mobile Device User Interface to Enable Testing of User Interface Consistency", which is incorporated herein by reference.

Figure 4:
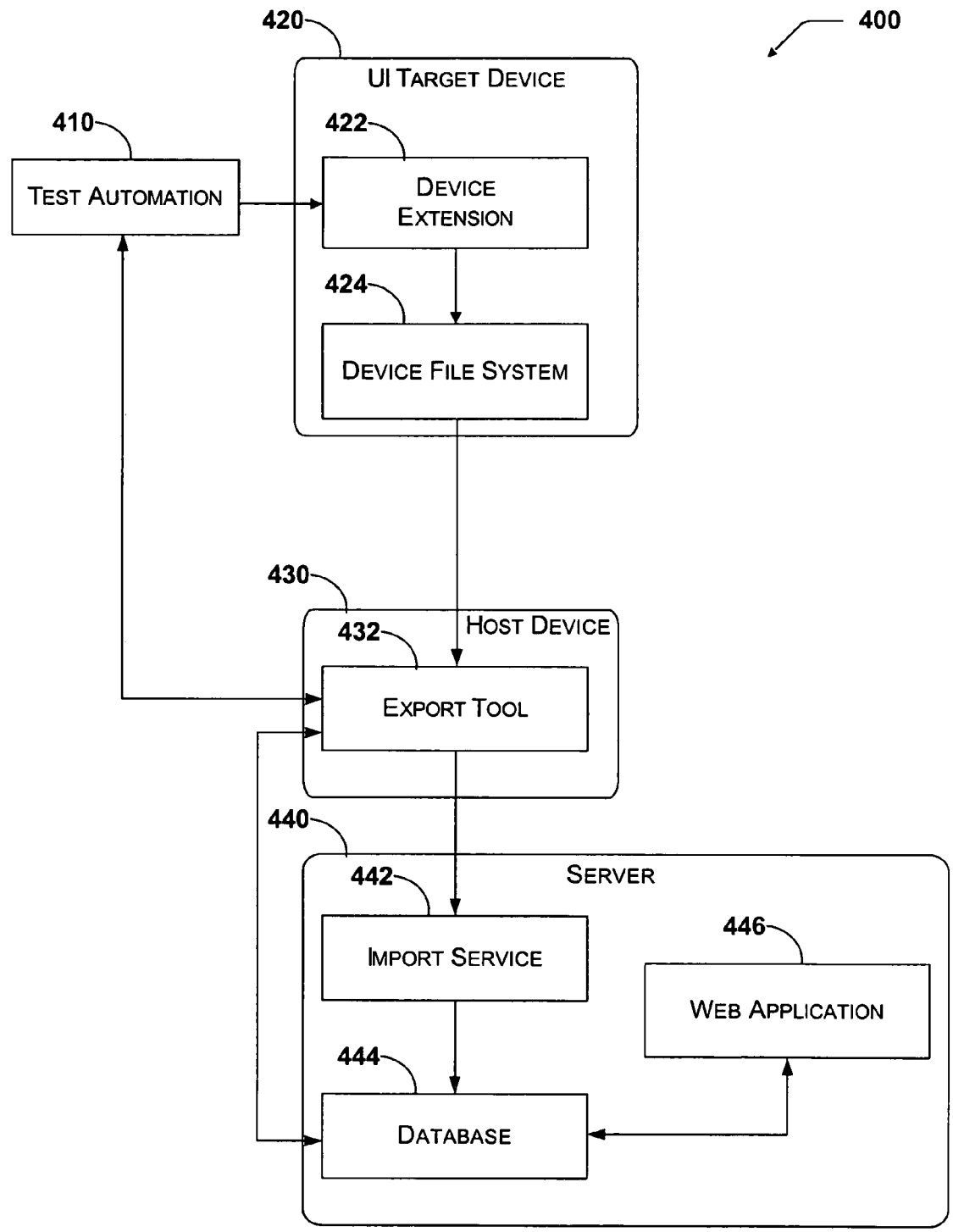
FIG. 4 illustrates an exemplary function block diagram of a system for automatically determining differences in a user interface in accordance with the present invention.

FIG. 4 illustrates an exemplary function block diagram of a system for automatically verifying a user interface in accordance with the present invention. The system 400 includes test automation 410, user interface (UI) target device 420, host device 430, and server 440. UI target device 420 includes device extension 422 and device file system 424. Host device 430 includes export tool 432. Server 440 includes import service 442, database 444, and web application 446.

Test automation 410 provides the functionality for instructing UI target device 420 to exercise its user interface. Test automation 410 calls device extension 422. The operation of test automation 410 and device extension 422 is described in greater detail in the discussion of FIG. 6 below. Essentially test automation 410 exercises the user interface while device extension 422 takes snapshots. Device extension 422 then stores the snapshots in the form of bitmap files and extensible markup language (XML) files in device file system 424.

Export tool 432 of host device 430 uploads the bitmap files and the associated XML files to server 440 from device file system 424. In addition, export tool 432 may provide an indication of a pass/fail status of the test. The pass/fail status may then be transmitted to test automation 410 in response to a call from test automation 410. The pass/fail assessment may also be transmitted to database 444 of server 440.

Import service 442 processes the results as they are uploaded to server 440. The results are stored in database 444. The architecture of database 444 is described in greater detail in the discussion of FIG. 5 below. Web application 446 is then able to display the results across a network. The results are displayed so that a user is able to manipulate the results to refine their analysis. For example, a user is able to track known bugs that occur in the user interface output by tracking the differences that occur between snapshots of different automation executions. The user is also able to verify and update individual snapshots while analyzing the visual representation of the differences through the difference snapshots that are produced.

In another embodiment, export tool 432 may be included in UI target device 420, eliminating the need for host device 430. In addition, test automation 410 may also be included in UI target device 420 such that the run of the test automation and production of the snapshots is contained on UI target device 420. The results may then be directly transmitted to server 440 for display. In addition, the results may be displayed directly on UI target device 420 by incorporating database 444 on UI target device 420 as well.

Figure 5:
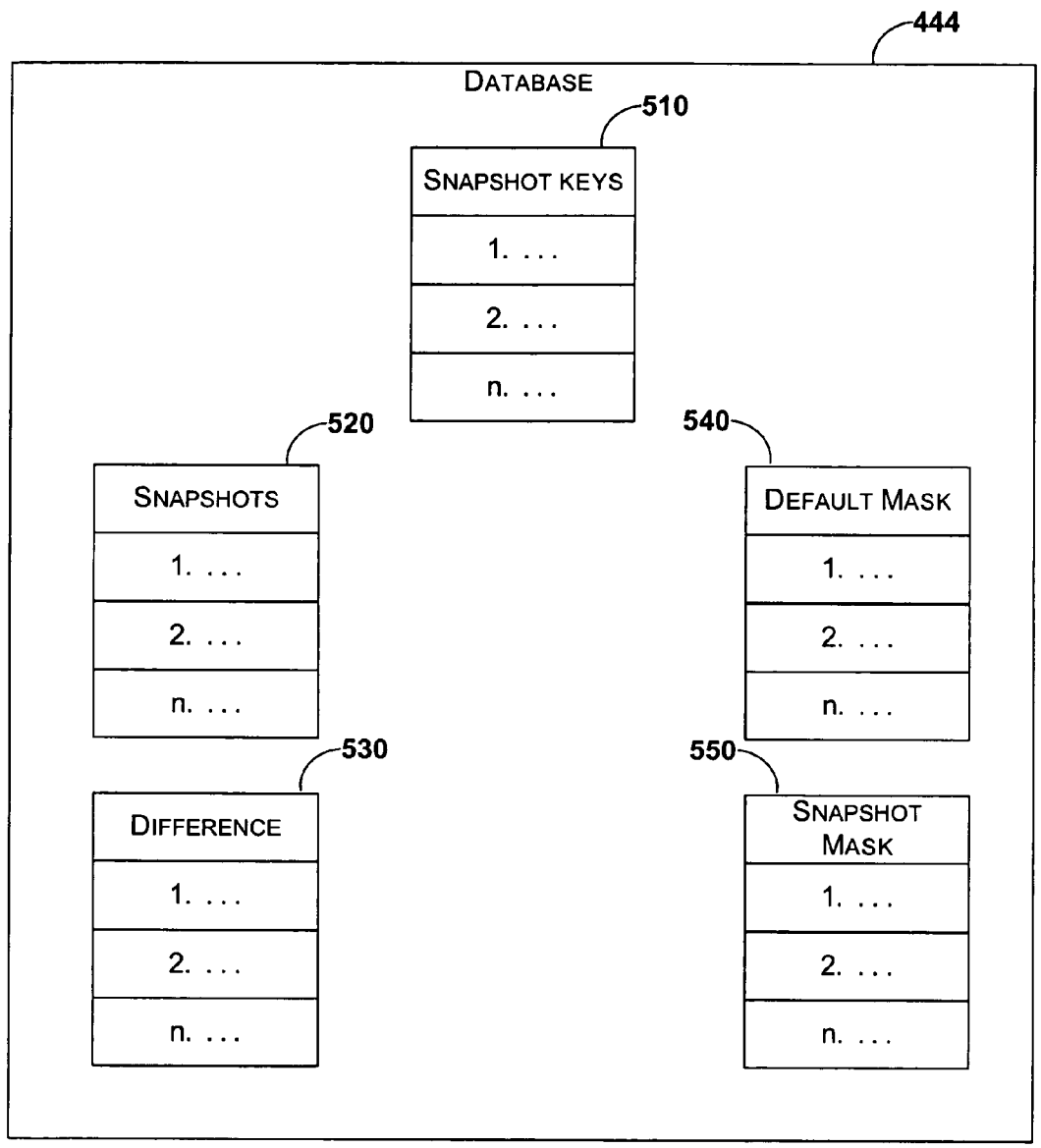
FIG. 5 illustrates an exemplary functional block diagram of a database used in the system of FIG. 4 in accordance with the present invention.

FIG. 5 illustrates an exemplary functional block diagram of a database used in the system of FIG. 4 in accordance with the present invention. Database 444 includes snapshot keys table 510, snapshots table 520, difference table 530, default mask table 540, and snapshot mask table 550.

Snapshot key table 510 includes a list of snapshot keys that identify each group of snapshots stored on database 500 as the snapshots are generated. In one embodiment, each snapshot key is defined according to information extracted from the XML file generated when the snapshot was taken. Accordingly, the key is generated using information regarding the device edition, the platform used, the language used, the color depth of the device, the screen size, and other unique aspects related to the snapshot.

Snapshots table 520 includes a list of the snapshots taken by filename and a count incremented to indicate that this is the latest confirmed snapshot of a development cycle. The filename of the individual snapshots in snapshot table 520 is associated with at least one of the snapshot keys listed in snapshot key table 510. As new snapshots are generated, the new snapshots are added into snapshots table 520. Alternatively, when a snapshot corresponds to and matches a snapshot within snapshots table 520, the previous snapshot is replaced with the latest confirmed snapshot, and the count is incremented.

Difference table 530 includes the difference snapshots. The new snapshots having a particular snapshot key are compared with previous snapshots having the same key. If no difference exists between a new snapshot and a previous snapshot having the same key, the previous snapshot is replaced with the latest confirmed snapshot. If a difference does exist, the difference snapshot is included within difference table 530.

Default mask table 540 includes a list of default masks to be applied to all snapshots corresponding to a particular product and screen size. Snapshot mask table 550 includes both the default masks that correspond to a generated snapshot listed in snapshots table 520 and other masks that are user-defined. The use of default mask table 540 and snapshot mask table 550 is described in the related application entitled "Method and System for Masking Dynamic Regions in a Mobile Device User Interface to Enable Testing of User Interface Consistency", which is incorporated herein by reference.

In another embodiment, for each snapshot stored in snapshots table 520, a value of the snapshot is calculated. The value of the snapshot is referred to as its cyclical redundancy check (CRC) value, and is generated from the bitmap of the snapshot. The calculated CRC value provides a "fast check" mechanism whereby snapshots may be compared quickly by their CRC values.

Figure 6:
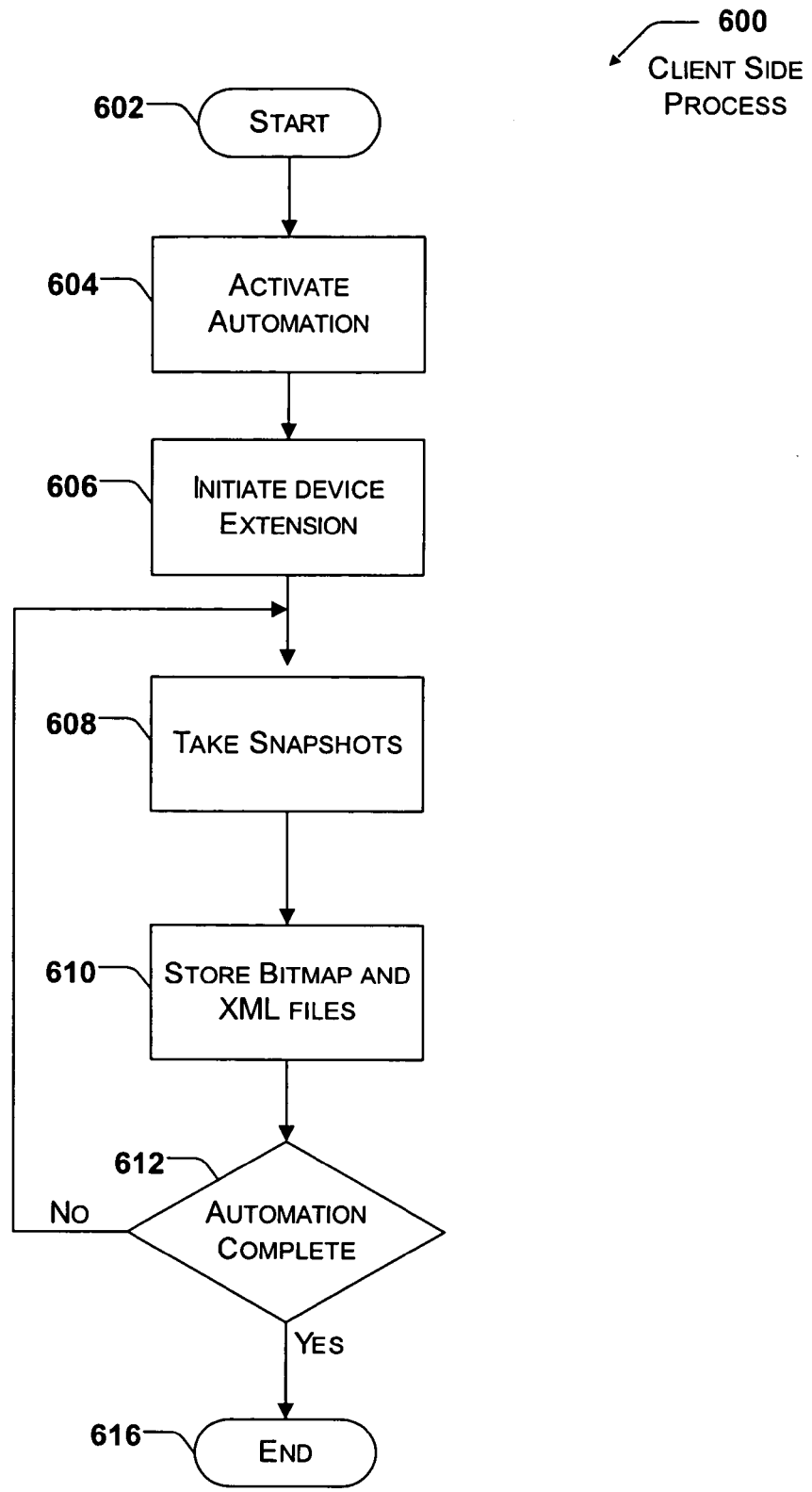
FIG. 6 illustrates a logical flow diagram for a client side process of automatically determining differences in a user interface in accordance with the present invention.

FIG. 6 illustrates a logical flow diagram for the client side process of automatically determining differences in a user interface in accordance with the present invention. Process 600 starts at block 602 where a UI target device includes a device extension and is loaded with a test automation. Processing continues at block 604.

At block 604, the test automation that is loaded on the UI target device is activated. The test automation exercises the user interface. During each automation execution, the user interface is exercised according to a test automation so that menus are pulled down, screen content is changed, and other activities are performed that affect the user interface output. Exercising the user interface through a variety of activities provides confirmation that the user interface is operating correctly across a range of possible executions. Processing continues at block 606.

At block 606, a device extension residing on the UI target device as shown in FIG. 4 is initiated. The device extension takes snapshots of the user interface of the UI target device. The snapshots are taken throughout a automation execution for multiple automation executions to generate a development cycle for the user interface. In an additional embodiment, the device extension may take multiple snapshots of the user interface for each interval of the build. For example, some mobile devices make use of a software input panel (SIP) that may dynamically change the elements of the screen. The device extension therefore takes a snapshot of the user interface with the SIP and without the SIP for each interval in the automation execution. In another example, a device may allow for portrait to landscape screen rotation. In this example, the device extension takes a snapshot of the user interface in portrait and in landscape orientations. Once the device extension is initiated, processing continues at block 610.

At block 610, the device extension stores the snapshots as bitmap and XML files in the file system of the UI target device. It is appreciated that the snapshots may be stored in various data forms other than in bitmap and XML that are well known in the art and are not described further herein. In one embodiment, when the snapshots of the user interface are recorded, a bitmap file of the snapshot image is recorded along with an extensible markup language (XML) file. The XML file includes information such as the language, screen size, SKU (i.e. edition), and other aspects of the target device from which the snapshot is taken.

The following is an exemplary portion of an XML file that may be generated in accordance with the present invention:

```
<?xml version="1.0" ?>
- <!-- VisualDiff - File Import Information -->
- <VisualDiff-FileImportInfo>
    <Source>Shell_Notifications_TestApp</Source>
    <Area>ShellAPI</Area>
    <SIP>0</SIP>
    <Title>Shell_Notifications_Bad_SHNOTIFICATION_Struct
    </Title>
    <Product>Magneto-PocketPC Phone</Product>
    <LCID>0409</LCID>
    <ColorDepth>16</ColorDepth>
    <ScreenX>240</ScreenX>
    <ScreenY>320</ScreenY>
    <BulidNum>14020</BulidNum>
    <Platform>x86</Platform>
    <Filename>
    VD_ShellAPI_Shell_Notifications_Bad_SHNOTIFICATION_
    Struct_Magneto-PocketPCPhone04091624
    0320_14020_x8601272004211634.bmp</Filename>
    </VisualDiff-FileImportInfo>
```

As shown in this example, the XML file includes a number of variables related to the display of the UI target device. With this information from the XML file, a particular snapshot may be uniquely identified within the database. After the bitmap and XML files are stored in the device file system, processing continues at decision block 612.

At decision block 612, a determination is made whether the automation execution is complete and all the snapshot have been taken with their associated files stored. If the automation execution is not complete, processing returns to block 608 where snapshots continue to be collected. If however, the automation execution is complete, processing proceeds to block 616 where process 600 ends.

In an alternative embodiment, the bitmap and XML files continue to be stored in the device file system through multiple automation executions, such that all the snapshots for comparison are stored prior to uploading or analyzing the files.

Figure 7:
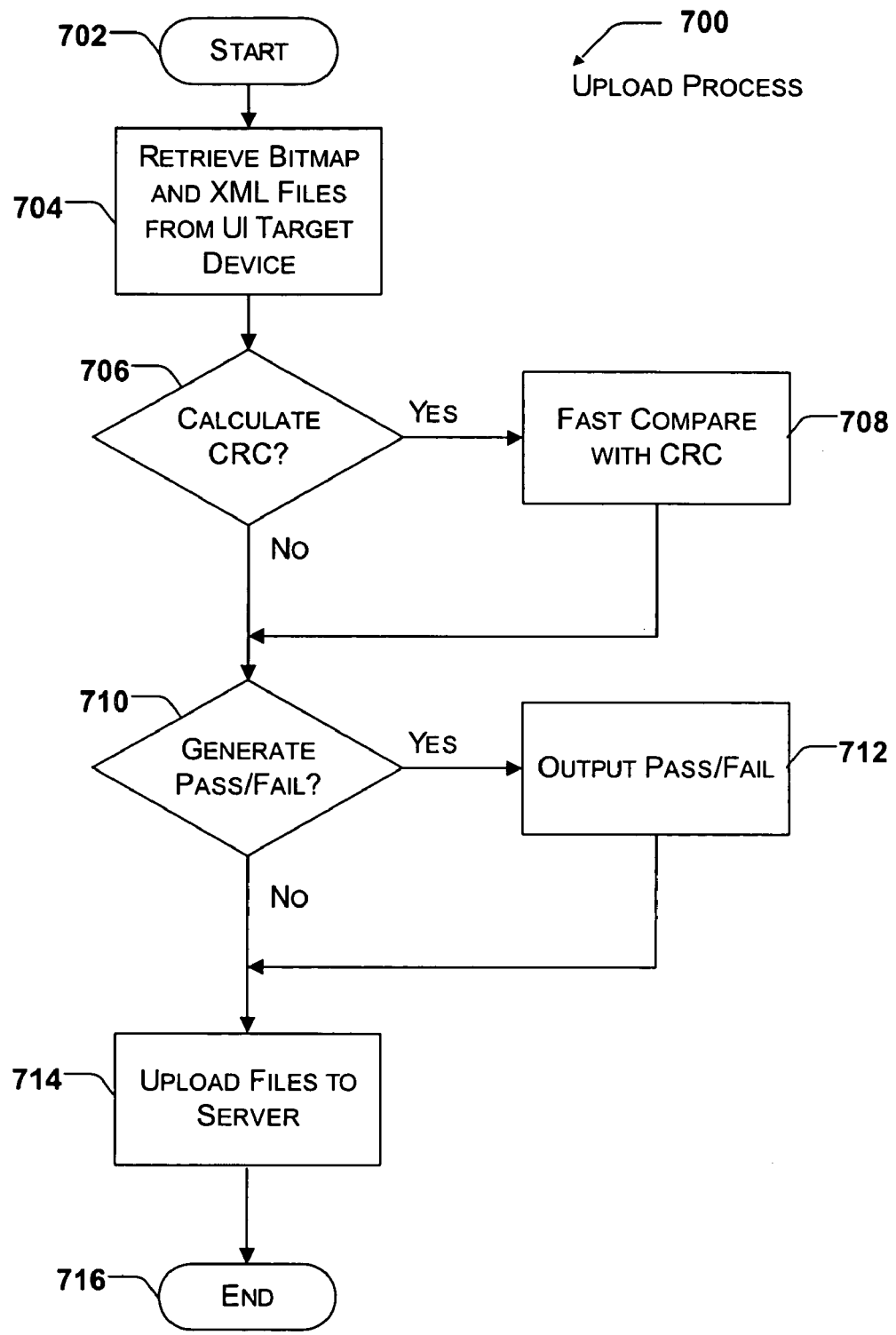
FIG. 7 illustrates a logical flow diagram for an upload process of automatically determining differences in a user interface in accordance with the present invention.

FIG. 7 illustrates a logical flow diagram for the upload process of automatically determining differences in a user interface in accordance with the present invention. Process 700 starts at block 702 where the bitmap and XML files corresponding to the snapshots of a automation execution are stored in the UI target device file system. Processing continues at block 704.

At block 704, the bitmap and XML files are retrieved from the UI target device by an export tool located on host device. The export tool runs a application for extracting the files from the UI target device. Once the files are extracted, processing continues at decision block 706.

At decision block 706, a determination is made whether to have the export tool calculate the cyclical redundancy check (CRC) value for the bitmap of the snapshot. An option may be included such that the user chooses whether to have the CRC calculated. If the CRC is calculated, processing moves to block 708. If however, the determination is made not to calculate the CRC, processing advances to decision block 710.

At block 708, the user may optionally perform a fast compare between snapshots based on the CRC. This "fast check" option is described in greater detail above with relation to FIG. 5. Processing then continues at decision block 710.

At decision block 710, a determination is made whether generate a pass/fail variable. The pass/fail variable indicates whether, on initial examination, the user interface snapshots contain differences when compared. An option may be included such that the user chooses whether to generate the pass/fail variable at this time. If the pass/fail variable is generated, processing moves to block 712. If however, the determination is made not to generate the pass/fail variable, processing advances to block 714.

At block 712, the pass/fail variable is output to the test automation and the database of the server as shown in FIG. 4. The pass/fail variable is output to the test automation to provide a tester with feedback of the success or failure of the test during at the conclusion of the test. The pass/fail variable is output to the database of the server to provide a record of the pass/fail result that may be accessed on the server through a network. Once the pass/fail variable is output, processing continues at block 714.

At block 714, the bitmap and XML files are uploaded to the server by the export tool. The export tool prepares the data as necessary for transmission and then transmits the data to the server via a network protocol. Network protocols are well know in the art and are not further described herein. Process 700 then moves to block 716 where the process ends.

Figure 8:
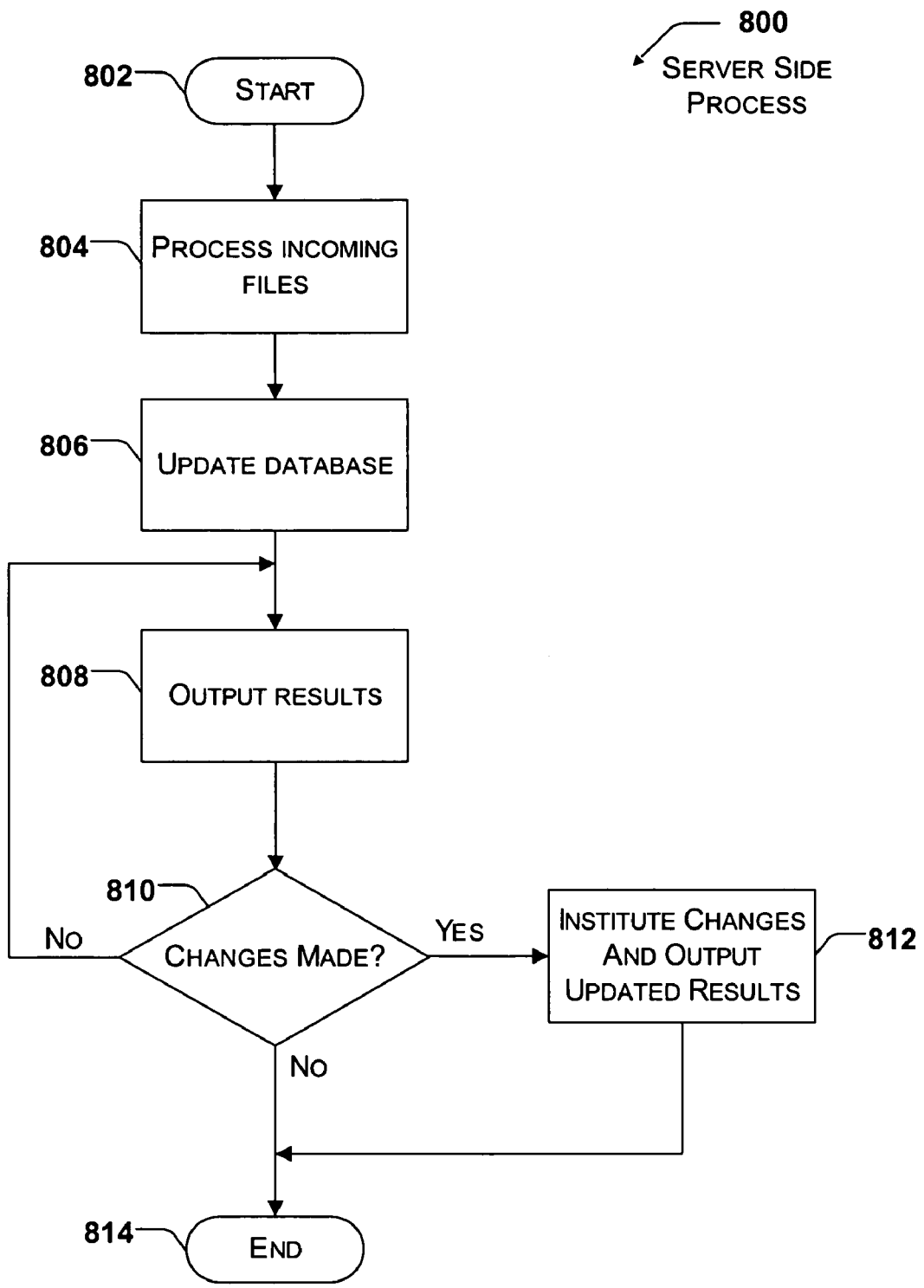
FIG. 8 illustrates a logical flow diagram for a server side process of automatically determining differences in a user interface in accordance with the present invention.

FIG. 8 illustrates a logical flow diagram for the server side process of automatically determining differences in a user interface in accordance with the present invention. Process 800 starts at block 802 where the bitmap and XML files have been uploaded to the server. Processing continues at block 804.

At block 804, the incoming files from the export tool are processed by the import service as shown in FIG. 4. The files are processed according to the network protocol used and other formatting considerations. Processing continues at block 806.

At block 806, the database of the server is updated as the snapshots are compared with previous snapshots of other builds as necessary. The architecture of the database is described in greater detail in the discussion of FIG. 5 above. Each of the tables in the database is updated as necessary for the incoming snapshots from the UI target device. Once the database is updated, processing continues at block 808.

At block 808, the results of the database update are output by a web application that provides the user with options for manipulation of the data. In one embodiment, the user has options to add and delete masks as well as make other changes for further analysis of the data. Processing continues at decision block 810.

At decision block 810, a determination is made whether the user has decided to make a change to the data stored in the database. If the user has decided make a change, processing moves to block 812. However, if the user has decided not to make a change to the data, processing advances to block 814 where the process ends.

At block 812, the changes chosen by the user are instituted in the database and the updated results are output by the web application for analysis. For example, the user may have decided to change the baseline snapshot of group of snapshots from an earlier snapshot to a later snapshot. The snapshots table described in FIG. 5 is then updated by deleting the earlier snapshot and replacing it with the later snapshot. Once any changes by the user are instituted in the database, processing proceeds to block 814 where process 800 ends.

In an alternative embodiment, process 700 of FIG. 7 may be eliminated and processes 600 and 800 of FIGS. 6 and 8 may be combined such that the automation process is performed by the UI target device and the UI target device also displays the results from the testing process.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for user interface testing, comprising:
    taking a first snapshot of a user interface on a target device during a first automation execution;
    providing a file that includes information regarding properties of the target device that corresponds to the first snapshot, wherein a snapshot key is produced from a selectable combination of the information included in the file;
    taking a second snapshot of the user interface on the target device during a second automation execution;
    comparing pixels of the first snapshot to corresponding pixels of the second snapshot; and
    producing a visual output of the difference between the first snapshot and the second snapshot.

2. The computer-implemented method of claim 1, further comprising storing the first snapshot and the second snapshot on the target device.

3. The computer-implemented method of claim 1, further comprising storing a first bitmap file and a first extensible markup language file corresponding to the first snapshot and storing a second bitmap file and a second extensible markup language file corresponding to the second snapshot.

4. The computer-implemented method of claim 1, further comprising uploading the first snapshot and the second snapshot to a server using an export tool.

5. The computer-implemented method of claim 4, wherein the export tool is present on a host computer to which the target device and the server are in communication.

6. The computer-implemented method of claim 1, further comprising an initial comparison of a property of the first snapshot to a corresponding property of the second snapshot, wherein the initial comparison provides a pass/fail variable.

7. The computer-implemented method of claim 1, wherein the visual output of the difference between the first snapshot and the second snapshot includes a highlighted pixel for each pixel that is different between the first snapshot and the second snapshot.

8. The computer-implemented method of claim 1, wherein a filename is produced from a selectable combination of the information included in the file, wherein the filename is associated with the first snapshot.

9. The computer-implemented method of claim 1, further comprising calculating a cyclical redundancy check value based on the first snapshot.

10. A computer-readable medium that includes computer-executable instructions for providing automatically determining differences in a user interface throughout a development cycle, comprising:
- taking a first snapshot of a user interface on a target device during a first automation execution;
- storing a first bitmap file and a first extensible markup language file corresponding to the first snapshot;
- taking a second snapshot of the user interface on the target device during a second automation execution;
- storing a second bitmap file and a second extensible markup language file corresponding to the second snapshot;
- comparing a property of the first snapshot to corresponding property of the second snapshot; and
- producing an output of the difference between the first snapshot and the second snapshot.

11. The computer-readable medium of claim 10, further comprising uploading the first bitmap file, first extensible markup language file, second bitmap file, and second extensible markup language file to a database on a server.

12. The computer-readable medium of claim 10, wherein the comparison of the property of the first snapshot to the corresponding property of the second snapshot provides a pass/fail variable.

13. The computer-readable medium of claim 10, wherein the output of the difference between the first snapshot and the second snapshot comprises a visual output with a highlighted pixel for each pixel that is different between the first snapshot and the second snapshot.

14. The computer-readable medium of claim 10, wherein a snapshot key is produced from a selectable combination of information included in the extensible markup language file.

15. The computer-readable medium of claim 10, wherein a filename associated with the first snapshot is produced from a selectable combination of information included in the extensible markup language file.

16. The computer-readable medium of claim 10, wherein the property of the first snapshot is a first cyclical redundancy check value based on the first snapshot and the corresponding property of the second snapshot is a cyclical redundancy check value based on the second snapshot.

17. A system for providing automatically determining differences in a user interface throughout a development cycle, comprising:
- a target user interface device that includes a first application that is configured to:
  - take a first snapshot of a user interface on a target device during a first automation execution,
  - take a second snapshot of the user interface on the target device during a second automation execution,
  - store the first snapshot and the second snapshot;
- a host device that includes a second application that is configured to upload the first snapshot and the second snapshot; and
- a server that includes a third application that is configured to:
  - receive the first snapshot and the second snapshot,
  - compare a property of the first snapshot to corresponding property of the second snapshot, wherein the property of the first snapshot is a first cyclical redundancy check value based on the first snapshot and the corresponding property of the second snapshot is a cyclical redundancy check value based on the second snapshot, and
  - produce an output of the difference between the first snapshot and the second snapshot.

18. The system of claim 17, wherein the first application is further configured to store a first bitmap file and a first extensible markup language file corresponding to the first snapshot and storing a second bitmap file and a second extensible markup language file corresponding to the second snapshot.

19. The system of claim 17, wherein the comparison of the property of the first snapshot to the corresponding property of the second snapshot provides a pass/fail variable.

20. The system of claim 17, wherein the output of the difference between the first snapshot and the second snapshot comprises a visual output with a highlighted pixel for each pixel that is different between the first snapshot and the second snapshot.

21. The system of claim 17, wherein the third application is further configured to provide a snapshot key from a selectable combination of information included in a file related to the first snapshot.

22. The system of claim 17, wherein a filename associated with the first snapshot is produced from a selectable combination of information included in a file related to the first snapshot.

* * * * *